United States Patent [19]

Peterson et al.

[11] Patent Number: 4,462,921
[45] Date of Patent: Jul. 31, 1984

[54] SILOXANE STABILIZERS FOR INORGANIC SILICATES IN ANTIFREEZE/COOLANT FORMULATIONS

[75] Inventors: Edward S. Peterson; Jerome W. Darden, both of Austin, Tex.

[73] Assignee: Texaco Inc., White Plains, N.Y.

[21] Appl. No.: 460,435

[22] Filed: Jan. 24, 1983

[51] Int. Cl.³ .................................................. C09K 5/00
[52] U.S. Cl. ...................................... 252/78.3; 252/75; 252/174.15; 556/415; 556/419; 556/439
[58] Field of Search .................... 252/75, 78.3, 174.15; 556/415, 419, 439

[56] References Cited

U.S. PATENT DOCUMENTS

| | | | |
|---|---|---|---|
| 2,468,869 | 5/1949 | Daudt | 252/78.3 |
| 2,693,451 | 11/1954 | Heisig | 252/75 |
| 2,962,446 | 11/1960 | Cook | 252/78.3 |
| 3,312,622 | 4/1967 | Pines et al. | 252/75 |
| 3,337,496 | 8/1967 | Pines et al. | 528/38 |
| 3,341,469 | 9/1967 | Pines et al. | 528/32 |
| 3,341,494 | 9/1967 | Millward et al. | 528/25 |
| 4,287,077 | 9/1981 | Wing | 252/75 |
| 4,331,555 | 5/1982 | Baskent et al. | 251/351 |

FOREIGN PATENT DOCUMENTS 661752  4/1963  Canada ................................. 252/75

Primary Examiner—John E. Kittle
Assistant Examiner—Mukund J. Shah
Attorney, Agent, or Firm—Jack H. Park; Kenneth R. Priem; David L. Mossman

[57] ABSTRACT

Stabilizers for inorganic silicate corrosion inhibitor additives in antifreeze/coolant formulations are described. The stabilizers have the structure

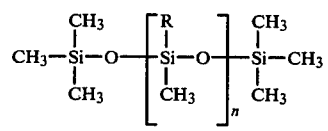

where n is an integer from 1 to 20 and R is a solubilizing agent. The solubilizing group may be a cyano-terminated group, a diol ether group, an acid group, an amide group, a group which will yield a diol on hydrolysis, among others. These stabilizers help prevent the inorganic silicate additives from precipitating out and thus extend the shelf life of antifreeze formulations into which they are incorporated.

6 Claims, No Drawings

SILOXANE STABILIZERS FOR INORGANIC SILICATES IN ANTIFREEZE/COOLANT FORMULATIONS

BACKGROUND OF THE INVENTION

1. Field of the Invention

The invention relates to stabilizers for inorganic silicate corrosion inhibitors used in antifreeze/coolant formulations and particularly relates to such stabilizers which are organic polysiloxanes.

2. Related Stabilizers in the Field

Antifreeze compositions containing glycols and various corrosion inhibitors are well known in the prior art as is illustrated by U.S. Pat. Nos. 3,282,846 and 3,362,910. The use of the relatively inexpensive and effective borax and silicates in glycol formulations as corrosion inhibitors is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or store. The end user, when he attempted to pour the glycol concentrate into his automotive radiator, found that the concentrate had developed "slugs" or gels which either did not pour readily or which tumbled out in discrete masses along with the liquid. The present invention was developed to eliminate this gel formation.

In U.S. Pat. No. 4,149,985, there is disclosed that a gellation resistant glycol composition containing borate and silicate additives can be made wherein the order of addition of the additives and the pH of the solution is closely controlled in order to obtain the gellation resistant formulation.

In U.S. Pat. No. 3,312,622, there is disclosed a corrosion resistant glycol composition containing an organosilicon co-polymer having carboxylate salt groups and silicate groups.

Other organosiloxane compounds are known to help prevent the silicates from forming gels. See, for example, the compounds disclosed in U.S. Pat. Nos. 3,337,496 and 3,341,496. Particularly pertinent to the present invention are the ether modified polymethyl oxygen-containing silicone polymers of U.S. Pat. No. 4,287,077 which are also taught as being good gellation-resistant additives.

Many types of organosiloxane compounds are known in the art. For example, U.S. Pat. No. 2,846,458 describes organosiloxane compounds that have been modified with ethers, particularly the mono- and diethers of glycols and polyglycols. Such materials were then known to be useful as surface-active agents, release agents, lubricants, antifoam agents and as cosmetic additives. These compositions did not encompass polymers of silicon.

A method for making carbalkoxyalkyl polysiloxanes is revealed in U.S. Pat. No. 3,065,202. Such compounds were useful as plasticizers for organopolysiloxane resins and rubbers and as lubricants. U.S. Pat. No. 3,105,061 teaches a method for the preparation of diorganopolysiloxane polymers by the reaction of diacyloxysilanes and siloxanes with mono- and dihydroxy silanes siloxanes.

The addition of SiH compounds to aliphatic unsaturated compounds in contact with chloroplatinic acid can be achieved in the presence of hydroxyl compounds such as water or alcohols according to U.S. Pat. No. 3,398,174. The organosilicon compounds made therein may contain ether substituents.

Finally, various organosiloxane compounds having cyano-, ether-, hydroxy- or phenylorgano modifying moieties are taught in U.S. Pat. No. 4,331,555 which teaches that such compounds are useful as foam stabilizers in flexible polyester polyurethane foam.

There remains a need for a gellation resistant stabilizer that allows smaller effective amounts to be used and which is less expensive than those currently used.

SUMMARY OF THE INVENTION

The invention concerns a gellation resistant aqueous glycol composition comprising 85 to 98 percent by weight of an alkylene glycol, an alkylene glycol ether or mixtures thereof, an effective amount to reduce corrosion of an inorganic alkali metal silicate and an effective amount to improve gellation resistance of a glycol soluble organosiloxane polymer having the formula

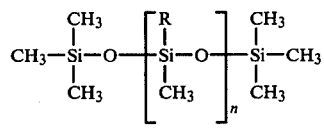

where n is an integer from 1 to 20 and R is selected from the group consisting of a cyanoterminated moiety, a diol ether moiety, a carboxylic acid moiety and an amide moiety.

DETAILED DESCRIPTION OF THE PREFERRED EMBODIMENTS

The glycols and glycol ethers which can be used as major components in the present composition include glycols, such as ethylene glycol, diethylene glycol, propylene glycol and dipropylene glycol and glycol monoethers such as the methyl, ethyl, propyl and butyl ether of ethylene glycol, diethylene glycol, propylene glycol and dipropylene glycol. Also useful are glycol diethers such as the methyl and ethyl diethers of ethylene glycol, diethylene glycol and dipropylene glycol. Ethylene glycol is particularly preferred as the major antifreeze composition component.

A number of known corrosion inhibitors and additives can be used in the present invention. The most preferred corrosion inhibitors are the alkali metal silicates, such as sodium metasilicate, potassium metasilicate and lithium metasilicate. Also preferred are the silicates represented by the formula

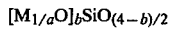

where M is a cation that forms a water soluble silicate, a is the valence of the cation represented by M and b has a value from 1 to 3, inclusive. This definition is used in U.S. Pat. Nos. 3,337,496 and 3,312,622.

Other corrosion inhibitors and additives may be used, such as alkali metal borates which include sodium tetraborate, potassium tetraborate, sodium metaborate and potassium metaborate. Other permissible components include alkali metal mercaptobenzotriazoles, alkali metal tolyltriazoles, alkali metal nitrates such as sodium nitrate and potassium nitrate, alkali metal nitrites such as potassium and sodium nitrite, alkali metal phosphates such as sodium phosphate and potassium phosphate, alkali metal benzoates and various antifoaming agents and dyes, if desired.

The stabilizer useful in this invention may be represented by the following formula

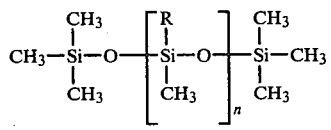

where n is an integer from 1 to 20 and R is a solubilizing agent. The solubilizing group may be a cyano-terminated moiety, a diol ether moiety, a carboxylic acid moiety or an amide moiety. Included in the definition of R is any moiety which would yield a diol moiety upon hydrolysis. Particular examples of appropriate solubilizing groups include, but are not limited to, cyanopropyl, 3-propoxyl-1,2-propane diol, propoxy malonic acid and propoxy-2,3-epoxy propane.

Gellation resistant additive compounds of the type described above may be prepared by reacting a polymethylsiloxane with an allylic derivative of a solubilizing group or an unsaturated derivative of a solubilizing group in the presence of a catalyst such as chloroplatinic acid, triethylamine or triphenylphosphine. Typical examples of this method of preparation are Examples 7 and 10 herein. The suitable reaction temperature for preparing these additives ranges between 25° and 150° C.

The amounts of corrosion inhibitors discussed above known to be effective are well known in the art. Of course, the amount will vary for each inhibitor. It is not possible to set forth exactly the amount of silicate to be used in each instance due to the complicating influence of the other corrosion inhibitors such as the aforementioned borates, triazoles, nitrates, nitrites and phosphates. Simple, accelerated aging tests can be used to determine the amount of silicate which when added will give the desired corrosion resistance. Generally, the proportion of silicates should range from about 0.025 to 1.0 percent by weight, preferably about 0.05 to 0.5 percent by weight.

The gellation resistant organosiloxane polymer should be used at levels of about 100 to 10,000 ppm to prevent gellation of the inorganic silicates in antifreeze/coolant formulations. These limits are much lower than those found in much of the prior art.

Throughout this specification it is noted that the gellation inhibitor is first created and subsequently added to the alkylene glycol composition. However, an alternate approach, which may turn out to be the preferred one in practice, is to form the gellation inhibitor in situ. For example, such an in situ formation could be accomplished by adding the compounds

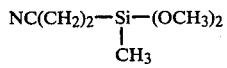

and (CH₃)₃SiOCH₃ to the glycol or glycol-water mix to form the compound

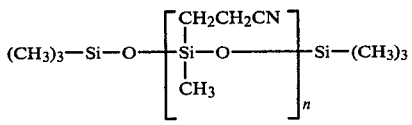

The invention relates to a glycol composition containing these gellation inhibitors and is not restricted by the method by which this is accomplished.

The method of this invention will be further illustrated by the following examples which are not intended to limit the invention, but rather to illuminate it.

EXAMPLE I

To an antifreeze concentrate formulation consisting of ethylene glycol, tolyltriazole, NaNO₃ and 0.03 weight percent Na₂SiO₃.5H₂O was added a trimethyl silyl-terminated polycyanopropylmethyl siloxane (Petrarch Systems, Inc., molecular weight = 700 by GPC using polypropylene glycol standards), hereafter referred to as PS-906, at a level of 200 ppm. The stabilized antifreeze concentrate was placed in a storage stability test. The storage stability test consists of placing 100g of the antifreeze or coolant formulation in an oven at 150° F. and noting the time needed for a gel to form. One day at 150° F. is approximately equal to one month at room temperature. Thus, the storage stability test gives a measure of the shelf life of the antifreeze or coolant formulation. The stabilized concentrate sample in this example showed no signs of gel formation after 36 days at 150° F., equivalent to a shelf life of greater than thirty-six months.

EXAMPLE II

The same antifreeze concentrate prepared in Example I was placed in the storage stability test except that no PS-906 was added. The sample showed gel formation after only seven days at 150° F., equivalent to a shelf life of seven months. Thus, the use of PS-906 increased the shelf life of the antifreeze concentrate five-fold.

EXAMPLE III

To the same antifreeze concentrate prepared in Example I was added 200 ppm of PS-906. The sample was placed in the storage stability test. This sample showed no signs of gel formation after thirty-six days at 150° F., equivalent to a shelf life of greater than thirty-six months.

EXAMPLE IV

To the same antifreeze concentrate prepared in Example I was added 500 ppm of PS-906. The sample was placed in the storage stability test. The sample showed no signs of gel formation after forty-three days at 150° F., equivalent to a shelf life of greater than forty-three months.

EXAMPLE V

A blend of the same antifreeze concentrate prepared in Example I and 500 ppm of PS-906 was prepared. In order to obtain the corrosion properties of this formulation, the ASTM D-1387-70 Corrosion Test for Engine Coolants in Glassware test and the Ford A1 Hot Surface Test were run. Results obtained using the blend prepared in this example are given below

| ASTM D-1384 Glassware Corrosion Test | | | | | | |
| --- | --- | --- | --- | --- | --- | --- |
| Antifreeze Concentrate No. | Weight loss, mg/coupon (avg. of 3 tests) | | | | | |
| | Copper | Brass | Solder | Steel | Iron | Aluminum |
| 5 | 2 | 2 | 1 | +0.4 | 4 | +5.2 |
| ASTM Spec., max | 10 | 10 | 30 | 10 | 10 | 30 |

| Sample No. | Ford Aluminum Hot Surface Test Weight loss, mg/cm$^2$ (avg. of 2 tests) |
| --- | --- |
| 5 | 0.2 |
| Ford Spec., max. | 1.0 |

EXAMPLE VI

To an antifreeze concentrate consisting of ethylene glycol, Na$_2$B$_4$O$_7$.5H$_2$O, sodium benzoate, Na$_2$MoO$_4$.2H$_2$O was added 1,000 ppm of PS-906. The sample was placed in the storage stability test. The sample showed no signs of gel formation after sixty days at 150° F., equivalent to a shelf life of greater than sixty months. The same antifreeze concentrate not stabilized with PS-906 showed gel formation after three days at 150° F.

EXAMPLE VII

To a 500-ml round bottom flask fitted with reflux condenser, dropping funnel, N$_2$ inlet and magnetic stirrer was added 90g of toluene, 25g of allyl glycidyl ether (0.22 mol) and 1.0g of a solution of H$_2$PtCl$_6$ in isopropanol containing 0.76 weight percent Pt. To the dropping funnel was added 19.5g of a polymethylhydrosiloxane, molecular weight 360–420 (Petrarch Systems, Inc., 0.05 mol). The pot temperature was raised to 60° C., at which point siloxane addition was begun. When siloxane addition was complete, the pot temperature was raised to 75°–85° C. and the contents stirred for three hours. The reaction mixture was placed in a rotoevaporator on a hot water bath to remove low boiling materials. The bottoms material was then purified by high vacuum distillation to a pot temperature of 163° C. Subsequently, 35.6 grams of a dark brown liquid product was obtained following distillation. Nuclear magnetic resonance showed that the allyl glycidyl ether group had added to the siloxane to give a material with a molecular weight of 800.

EXAMPLE VIII

To a 500-ml round bottom flask fitted with reflux condenser was added 377.6g of ethylene glycol and 0.2g of the siloxane prepared in Example VII. This blend was refluxed for six hours. Initially, the siloxane formed a distinct layer atop the ethylene glycol; however, after six hours of reflux, this layer could no longer be seen. The blend was filtered. Atomic absorption analysis showed 137 ppm Si in the glycol, equivalent to 700 ppm of siloxane.

EXAMPLE IX

An antifreeze concentrate was formulated using the glycol/siloxane blend prepared in Example VIII. It consisted of ethylene glycol, NaNO$_3$, tolyltriazole and 0.3 wt.% Na$_2$SiO$_3$.5H$_2$O. One hundred grams of the antifreeze concentrate was placed in the storage stability test. The sample showed no signs of gel formation after forty-eight days at 150° F., equivalent to a shelf life of greater than forty-eight months.

EXAMPLE X

To a 500-ml round bottom flask fitted as in Example VII was added 140 ml of t-butanol, 17.3g of glyceryl allyl ether (Alcolac, 0.13 mol), 10 ml of a buffer solution consisting of 3.2 ml 0.2N NaOH and 6.8 ml 0.2M KHC$_8$H$_4$O$_4$; and 1.2g of a 2% solution of H$_2$PtCl$_6$ in isopropanol containing 0.85 wt. % Pt. To the dropping funnel was added 19.5g of polymethylhydrosiloxane (Petrarch Systems, Inc., 0.05 ml). The pot temperature was raised to 60° C., at which point siloxane addition was begun. After siloxane addition was completed, the pot temperature was raised to 75°–85° C. and the contents of the pot stirred for three hours. Low boiling material was removed on a rotoevaporator. The material was purified by high vacuum distillation to a pot temperature of 150° C.. 27.7 grams of a dark brown liquid were obtained. Nuclear magnetic resonance analysis showed that the siloxane had added to the double bond of the glyceryl allyl ether.

EXAMPLE XI

To a 500-ml round bottom flask fitted with a reflux condenser was added 377.6g of ethylene glycol and 0.2g of the siloxane prepared in Example X. The mixture was heated at reflux for six hours, then filtered. Atomic absorption analysis of th glycol/siloxane solution showed 134 ppm Si, corresponding to 575 ppm of the siloxane.

EXAMPLE XII

An antifreeze concentrate was formulated from the glycol/siloxane mixture prepared in Example XI. It consisted of ethylene glycol, NaNO$_3$, tolyltriazole and 0.3 wt. % Na$_2$SiO$_3$.5H$_2$O. One hundred grams of this material as placed in the storage stability test. The sample showed no signs of gel formation after thirty-five days at 150° F., equivalent to a shelf life of greater than thirty-five months.

Many modifications may be made in this invention without departing from its spirit and scope which is defined only in the appended claims. For example, one could determine that a particular combination of an allyl glycidyl ether derivative of polymethylhydrosiloxane and an alkali metal silicate would be particularly effective.

We claim:

1. A gellation resistant aqueous glycol composition comprising
   (a) 85 to 98 percent by weight of an alkylene glycol, an alkylene glycol ether or mixtures thereof,
   (b) an effective amount to reduce corrosion of an inorganic alkali metal silicate, and
   (c) an effective amount to improve gellation resistance of a glycol soluble organosiloxane polymer having the formula

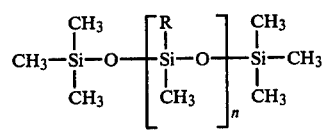

where n is an integer from 1 to 20 and R is selected from the group consisting of a cyano-terminated moiety, a diol ether moiety, a carboxylic acid moiety and an amide moiety.

2. The composition of claim 1 in which the alkylene glycol is ethylene glycol.

3. The composition of claim 1 in which the remainder of the composition is water and an effective amount of one or more other corrosion inhibitors.

4. The composition of claim 1 in which the amount of organosiloxane polymer ranges from about 100 to 10,000 ppm based on the total composition.

5. The composition of claim 1 in which the glycol soluble organosiloxane polymer is selected from the group consisting of a polycyanoalkylpolymethyl siloxane and a polyalkoxyalkane diol polymethyl siloxane.

6. The composition of claim 1 in which the glycol soluble organosiloxane polymer is selected from the group consisting of a polycyanopropylpolymethyl siloxane polymer and a polypropoxypropane diol polymethyl siloxane polymer.

* * * * *